Nov. 20, 1923.
H. J. BUCK
1,474,619
BREAD COOLING APPARATUS
Filed May 25, 1922
4 Sheets-Sheet 1
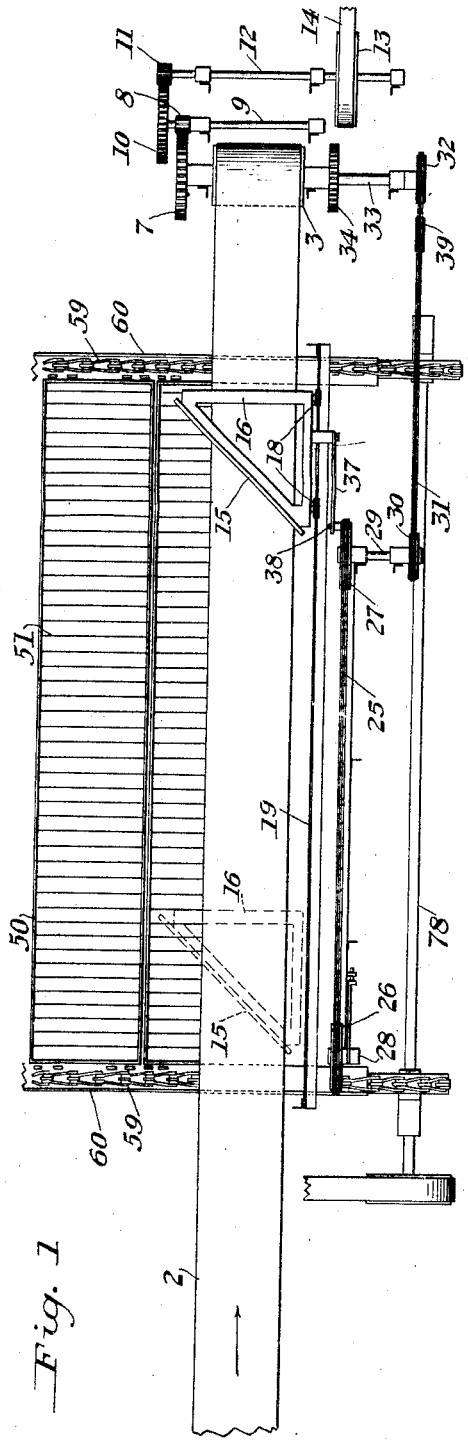
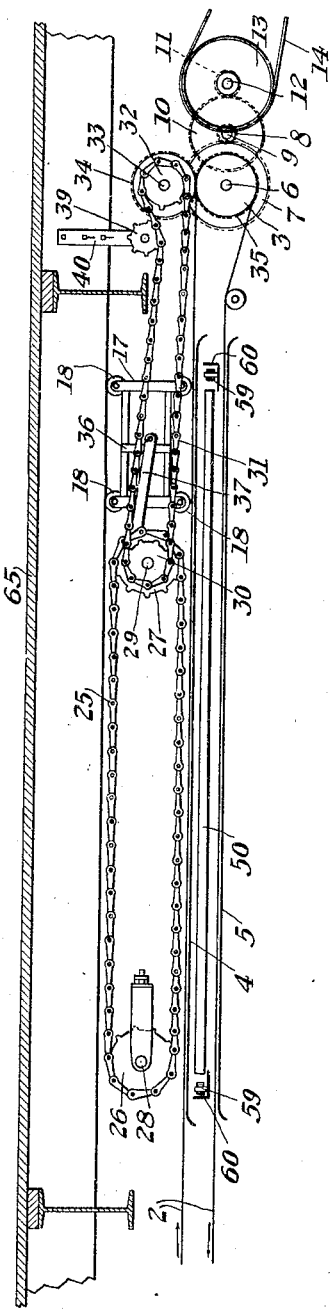
INVENTOR.
Herman J. Buck,
By Kay, Totten Brown,
Attorneys Nov. 20, 1923.
H. J. BUCK
1,474,619
BREAD COOLING APPARATUS
Filed May 25, 1922
4 Sheets-Sheet 2
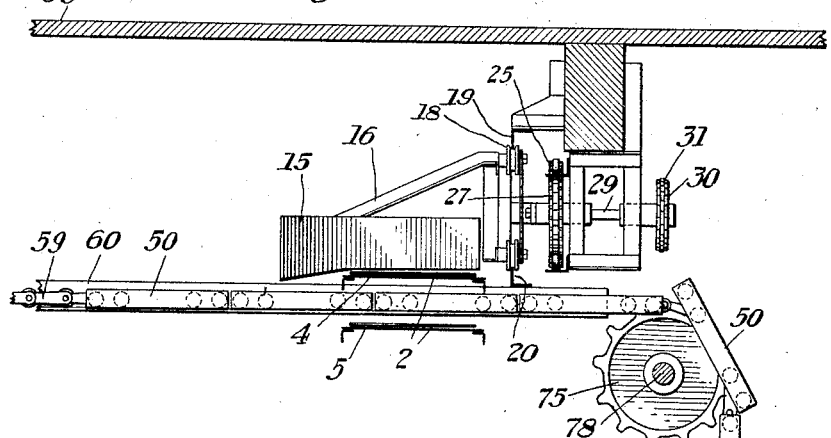
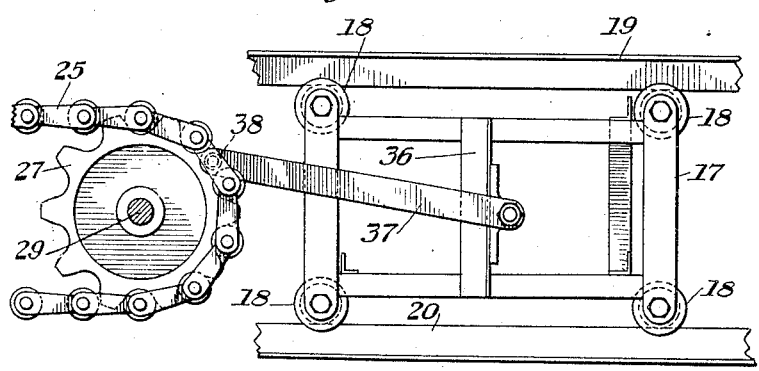
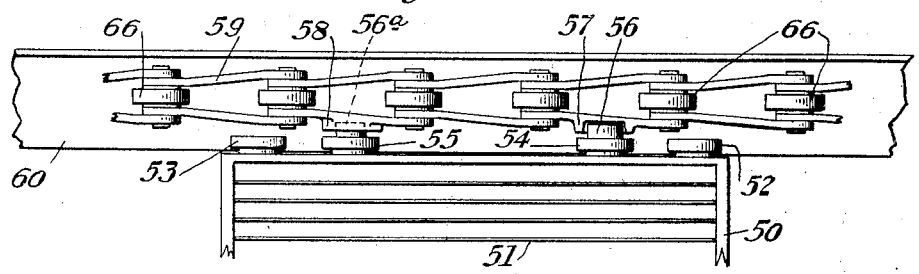

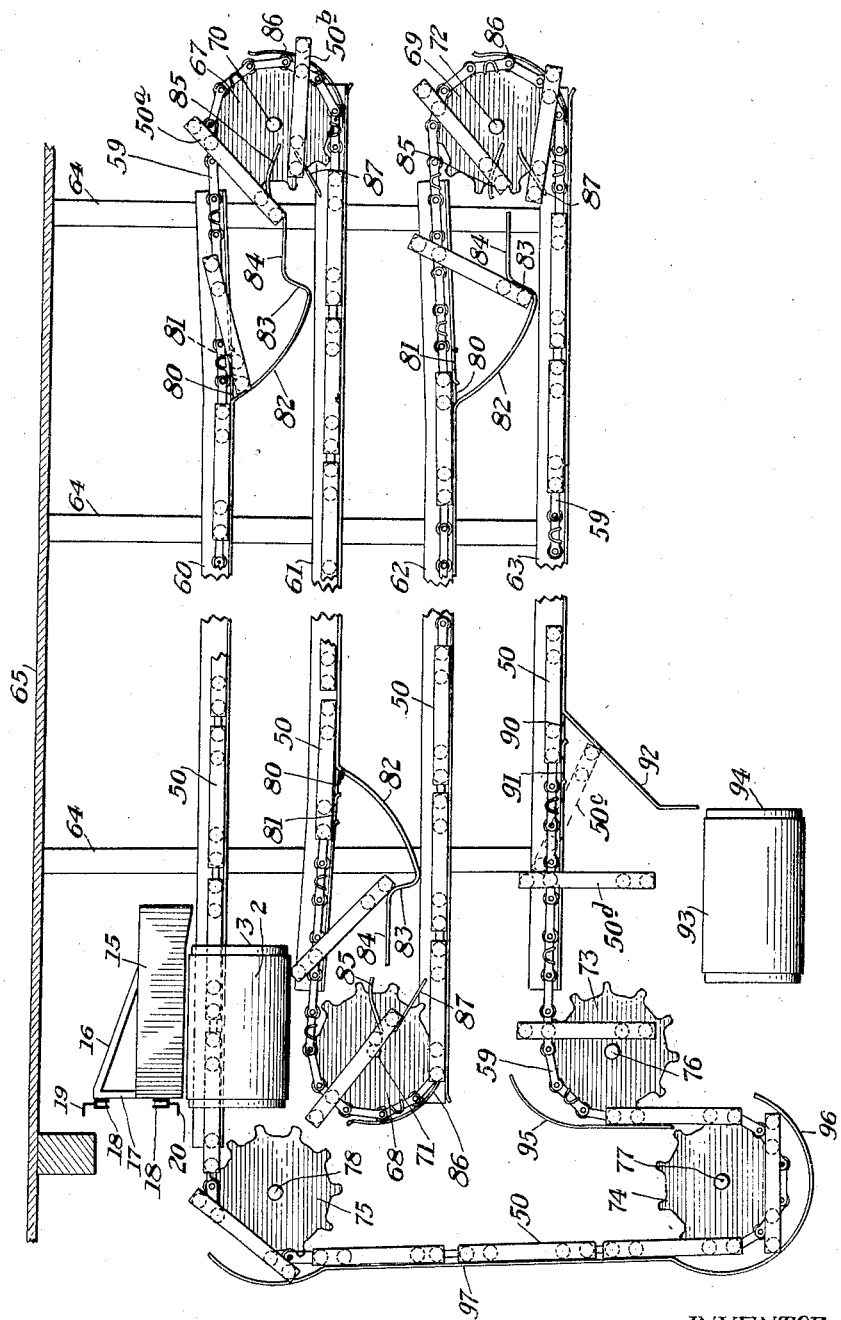

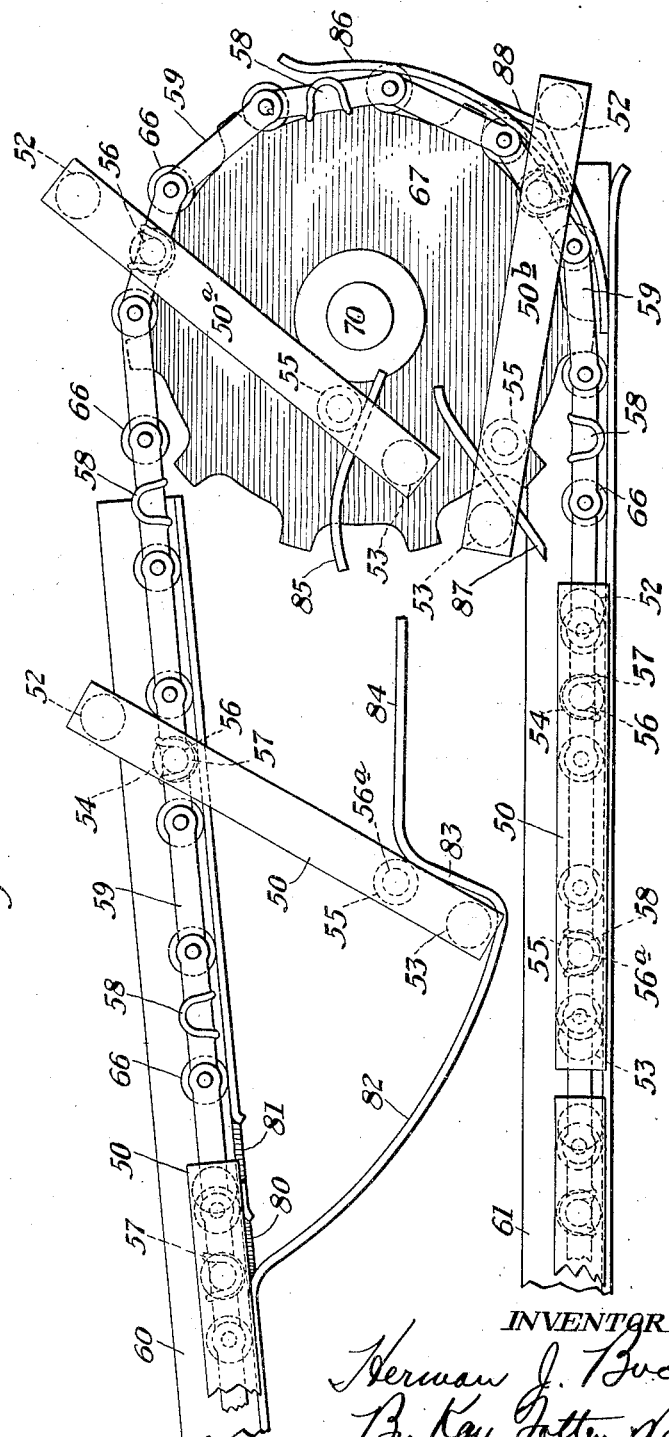

Patented Nov. 20, 1923.

1,474,619

UNITED STATES PATENT OFFICE.

HERMAN J. BUCK, OF ELLWOOD CITY, PENNSYLVANIA.

BREAD-COOLING APPARATUS.

Application filed May 25, 1922. Serial No. 563,745.

*To all whom it may concern:*

Be it known that I, HERMAN J. BUCK, a citizen of the United States, and resident of Ellwood City, in the county of Lawrence and State of Pennsylvania, have invented a new and useful Improvement in Bread-Cooling Apparatus; and I do hereby declare the following to be a full, clear, and exact description thereof.

My invention relates to conveying apparatus designed particularly, though not exclusively, for the purpose of receiving loaves of bread from an oven and cooling them by conveying the loaves for a considerable distance while exposed to the air in a cooling room or other convenient location.

One object of my invention is to provide a simple and effective device for transferring loaves of bread or other articles from a traveling carrier in the nature of a belt to another carrier moving in a different direction with respect to the first carrier.

Another object of my invention is to provide improved apparatus for conveying loaves of bread or other articles in a path which bends back and forth in several runs arranged one below the other, and to transfer the articles from each of these runs to the next without inverting the trays or other supports upon which the articles are carried.

When bread is taken from the oven, and before it is wrapped and delivered, it is necessary that it be cooled somewhat. For this purpose it is now customary, even in large bakeries, to empty the loaves from the baking pans upon boards or trays, and to place these boards or trays upon trucks which are then wheeled into a cooling room and left there for a suitable time, after which the trucks are moved to the wrapping room and the loaves are wrapped. This requires that the loaves be handled several times by hand, and the trucks are likely to be removed from the cooling room out of their turn, so that some bread is not cooled enough, while other bread is left in the cooling room longer than is necessary.

According to my present invention the bread, after leaving the oven, is emptied upon a conveyer which may be the endless cooling conveyer described below, or more conveniently may be a traveling belt which conveys the loaves to the cooling conveyer. In the latter case the loaves are pushed laterally from the first belt by means of a deflector device and are received on a cooling conveyer consisting of two parallel endless chains arranged on suitable sprocket wheels so as to follow a long path which is repeatedly bent upon itself to form several runs, one below the other. Stationary guides support the horizontal runs of the chains, and the chains engage and advance a series of trays, suitably consisting of metal frames having wires stretched across them for supporting the loaves of bread. The trays follow one another closely and, at each level of the conveyer, form a substantially continuous bread-supporting surface. The trays are not inverted at the ends of the horizontal paths, but are transferred from each of these paths to the one next below it without inverting the trays, by means described in detail below and consisting in general of a special method of attaching the trays to the chains and a system of stationary guides for directing the movement of the trays at the end of each horizontal section of the conveyer.

In the accompanying drawing, Fig. 1 is a plan view of the mechanism by which the loaves or other articles are transferred from the first conveyer to the second conveyer; Fig. 2 is an elevational view, with parts in section, of the construction shown in Fig. 1; Fig. 3 is an enlarged end view, with parts in section, of the same construction as seen from the left of Figs. 1 and 2; Fig. 4 is an enlarged elevational view of the deflector carriage; Fig. 5 is a somewhat diagrammatic side elevational view of the cooling conveyer; Fig. 6 is an enlarged elevational view of one of the mechanisms for transferring trays from one level of the cooling conveyer to the next lower level; and Fig. 7 is a partial plan view of the end of one of the trays showing the manner in which the trays are engaged by the endless conveyer chains.

In the drawing, the numeral 2 indicates the horizontal delivering end of a traveling belt, the upper run of which moves to the right in Figs. 1 and 2, and may be assumed to carry loaves of bread or other articles, not shown. The belt 2 passes around a pulley 3 and its upper and lower runs are supported upon guides 4 and 5 which maintain the belt horizontal beneath the deflector mechanism which is located above these guides. The pulley 3 is mounted on a shaft 6 which also carries a gear 7 meshing with a pinion 8 on a countershaft 9, which also carries a gear 10 meshing with the pinion 11 on a power shaft 12. The shaft 12 carries a pulley 13 which is driven from any suitable source of power, not shown, by means of a belt 14.

A vertical deflector plate 15 is mounted to reciprocate lengthwise of the belt 2, and is inclined forwardly with respect to the direction of movement of the belt 2 in such a way that when the deflector is moved to the left in Figs. 1 and 2 it will push the loaves of bread or other articles from the belt to the cooling conveyer which is located directly beneath the belt and which is described below. The deflector plate 15 is carried by a frame 16 that projects from a carriage 17 having wheels 18 which run upon tracks 19 and 20 arranged one above the other and consisting, as shown in Fig. 3, of angle bars secured to suitable fixed supports.

For the purpose of reciprocating the carriage 17 and the deflector 15, I provide an endless chain 25 which extends around sprocket wheels 26 and 27 carried by horizontal shafts 28 and 29, respectively. The shaft 29 also carries a sprocket wheel 30 and a chain 31 extends around the sprocket wheel 30 and also around a sprocket wheel 32 secured to a shaft 33 which carries a gear 34 meshing with a gear 35 on the pulley shaft 6. The carriage 17 has an upright member 36 to which is pivotally secured the end of a pitman 37, the other end of which is pivoted at 38 to one of the links of the chain 25. By means of the gearing just described the chain 25 is caused to carry with it the pitman 37, thus reciprocating the carriage 17 on its tracks 19 and 20. The parts are so proportioned that the carriage 17 moves at substantially the same speed as that of the belt 2, so that when the carriage moves to the right in Figs. 1 and 2 it travels ahead of the articles carried by the belt, and when moved to the left, as seen in these figures, it engages these articles and pushes them from the belt. An idler sprocket 39 is adjustably secured on a support 40 and engages the chain 31 to keep this chain tight.

The cooling conveyer which receives the loaves from the traveling belt 2 is composed of a series of trays 50, each of which consists of a rectangular metal frame having wires 51 stretched across it for supporting the loaves and provided on opposite ends with end rollers 52 and 53, and with intermediate rollers 54 and 55. The intermediate rollers 54 and 55 are mounted upon pins 56 and 56ª which project beyond the rollers and engage sockets carried by two parallel endless chains 59 running upon a set of tracks 60, 61, 62 and 63 that are arranged one above the other and may be supported by means of hangers 64 from a ceiling 65 or other suitable support, as shown in Fig. 5. These tracks may be of any desired number and length and may be formed from angle bars, as best shown in Fig. 2. They are spaced apart the proper distance to receive the parallel chains 59 and the trays 50.

The sockets 57 and 58 which engage the pins 56 and 56ª of the intermediate rollers 54 and 55 to advance the trays along the tracks may be of the semi-circular form best shown in Fig. 6, and are mounted with their open sides turned alternately in opposite directions, so that each of the trays 50, when it rests in its horizontal position on the tracks 60, for example, has its pins 56 engaged by the sockets 57 which open upwardly, while the other pins 56ª are engaged by the sockets 58 which open downwardly.

The links of the chains 59, as best shown in Fig. 7, are provided with rollers 66 which run upon the tracks 60, 61, 62 and 63. The chains are guided from the ends of the tracks to the next lower tracks by means of sprocket wheels 67, 68 and 69 mounted on horizontal shafts 70, 71 and 72, respectively. From the lowest track 63 the chains are guided back to the upper track 60 by means of sprocket wheels 73, 74 and 75 mounted on shafts 76, 77 and 78, respectively. One of the sprocket wheel shafts, suitably the shaft 78, may be connected to a source of power, not shown, for driving the entire system of sprockets and chains. This shaft 78 may extend across the full width of the machine as shown on Fig. 1, while the other sprocket shafts must not project inward beyond the chains 59, since these shafts, if extended across the machine, would interfere with the trays 50.

The means by which the trays 50 are transferred from the end of the one track to the next lower track are shown in Figs. 5 and 6, and will be described by following the movement of one of the trays 50 from the right-hand end of the track 60 to the next lower track 61, thence to the other tracks successively and back to the upper track 60. Near the end of the upper track 60 two openings 80 and 81 are formed in the horizontal flanges of each of the angle bars composing the track, these openings being spaced apart the same distance as the space between the rollers 53 and 55 of the tray 50. As each tray advances to the right in Figs. 5 and 6, its forward rollers 52 and 54 are carried across the openings 80 and 81, because the pins 56 which project from the rollers 54 are received at this time in sockets 57 which open upwardly and which therefore support the front end of the tray. When, however, the rear wheels 55 and 53 reach the openings 80 and 81 they fall through these openings and the tray tilts to the inclined position shown in Fig. 6, being guided in its downward tilting movement by means of a pair of flat guides 82 which engage the rear rollers 53 as soon as these rollers pass through the openings 80.

As the chain 59 continues to advance to the right, the tray 50 tilts still further and discharges the loaves which it carries upon the trays which are carried on the next lower track 61. Thereafter, the rear end of the tray 50 is raised by engagement of the rising portions 83 of the guide 82 with the rear rollers 53, which then run upon the horizontal portions 84 of these guides until the tray reaches the position shown at $50^a$. At this time the links carrying the sockets 57 which support the pins 56 of the tray have begun to pass around the sprocket wheels 67. Before the rear rollers 53 of the tray have run off the horizontal guides 84 the intermediate rollers 55 have run upon another guide 85 which prevents the tray from swinging to a vertical position.

As the chains 59 continue around the sprocket wheels 67, the sockets 57 engaging the forward pins 56 of the tray lose their supporting engagement with the pins 56, since these sockets open outwardly with respect to the sprocket wheels 67. To prevent the tray from leaving the chains at this time, I provide guides 86 which retain the pins 56 in the sockets 57 until the tray reaches the next lower track 61.

By the time that the rear intermediate rollers 55 of the tray have run off the guides 85, the rear end rollers 53 have run upon another pair of guides 87 which direct the tray in the approximately horizontal position shown at $50^b$, until it reaches the tracks 61. In order to prevent the tray from running off too rapidly from the position $50^b$, still another pair of guides 88 may be provided, and these guides will engage the forward wheels 52 of the tray and control its downward movement.

When the tray reaches the tracks 61 the pins $56^a$ of the rollers 55 are received in sockets 58 which now open upwardly, and the pins 56 of the rollers 54 remain in the sockets 57 which now open downwardly. Therefore, when the tray finishes its movement to the left on the track 61, the pins $56^a$ are supported and the pins 57 are unsupported, so that the rollers 52 and 54 at the rear end of the tray which, in the first operation described above, was the forward end of the tray, fall through the openings 80 and 81 in the track angles, and the tray is guided to the next lower tracks 62 by a system of guides similar to that described above.

In a similar manner the tray is transferred from the track 62 to the track 63 and proceeds to the left on the track 63 until the rear rollers 52 and 54 reach openings 90 and 91 similar to the openings 80 and 81 described above. The tray then tilts to the position shown at $50^c$, Fig. 5, being guided in its downward movement by engagement of the rollers 52 with a guide plate 92 which extends the full width of the conveyer, and is then permitted to swing to the vertical position shown at $50^d$, being supported at this time upon the pins $56^a$ of the rollers 55. This causes the loaves of bread to fall from the tray and the loaves, guided by the plate 92, fall upon a traveling belt 93 passing around a pulley 94. The belt 93 conveys the loaves to a convenient point for wrapping or for storage.

The tray, which is now suspended vertically as shown at $50^d$, continues with the chains 59 and as the chains pass around the sprocket wheels 73 the tray is prevented from leaving the chain by means of a pair of guides 95 which engage the tray rollers.

The lower end of the tray is next engaged by a pair of circular guides 96 which cause the tray to pass around the sprocket wheels 74 with the chains 59 and invert the tray so as to keep the same side of the tray always turned toward the sprocket wheels. When the chains 59 leave the sprocket wheels 74 the tray 50 is lifted vertically by the sockets engaging the pins 56 of the upper intermediate rollers 54. In order to prevent the trays from leaving the chains at th's time, vertical guides 97 are provided to engage the tray rollers in opposition to the sockets 57, which now open outwardly or to the left in Fig. 5. The sprocket wheels 75 bring the chains 59 into alignment with the upper tracks 60 and the tray is then deposited on these tracks, and passes beneath the belt 2, where it receives another load and thence begins another cycle of movement along the horizontal tracks.

In the operation of the apparatus described above, loaves of bread or other articles travel one behind the other on the upper run of the belt 2, preceded by the deflector 15 which advances in the same direction and at the same speed as the belt 2. Then the movement of the deflector 15 is reversed, and the deflector pushes a series of loaves from the belt 2 upon the trays which are advancing on the tracks 60. At the end of the tracks 60 the trays 50 are tilted in the manner described above, and the loaves slide from these trays to the trays which are moving in the reverse direction on the tracks 61. This movement is repeated at the end of each track until the loaves are delivered upon the belt 93 which removes the cooled bread to the wrapping room or other suitable point. The length of the cooling conveyer is such that the bread is sufficiently cooled when it reaches the belt 93, and for this purpose the tracks 60, 61, 62 and 63 may each be 60 feet or more in length.

While I have shown and described an arrangement of apparatus which is well suited for carrying out my invention, it will be understood that the structural details here shown may be varied in many respects without departing from my invention as set forth in the appended claims.

I claim as my invention:

1. Conveying apparatus comprising two carriers disposed adjacent to each other and movable in different rectilinear directions, and a deflector having an article-engaging surface inclined with respect to the directions of movement of both of said carriers for periodically pushing a series of articles from one of said carriers to the other.

2. Conveying apparatus comprising a continuously advancing article carrier, a second carrier adjacent to said first carrier and movable in a different direction with respect thereto, and a deflector having an article-engaging surface movable in a straight line and inclined with respect to the directions of movement of both of said carriers for periodically transferring articles from one of said carriers to the other.

3. Conveying apparatus comprising an endless traveling belt having an article-supporting portion that is movable in a horizontal direction, a second traveling carrier movable horizontally adjacent to said belt, and in a different direction with respect thereto, and a deflector having an article-engaging surface movable in a straight line and inclined with respect to the directions of movement of both of said carriers for periodically transferring articles from said belt to said second carrier.

4. Conveying apparatus comprising an endless traveling belt having an article-supporting portion that is movable in a horizontal direction, a second traveling carrier movable horizontally beneath said belt and in a different direction with respect thereto, and automatic means for periodically pushing a series of articles from said belt to said second carrier, said means including a deflector having an article-engaging surface movable in a straight line above said belt, said article-engaging surface being inclined with respect to the directions of movement of both said belt and said second carrier.

5. Conveying apparatus comprising an endless traveling belt having an article-supporting portion that is movable in a horizontal direction, a series of trays, a plurality of superposed tracks for supporting and guiding said trays, one of said tracks being disposed below the article-supporting portion of said traveling belt, automatic means including a deflector having an article-engaging surface permanently inclined with respect to the direction of movement of said belt for periodically pushing a series of articles o the trays of said adjacent track, and means for transferring said trays from one of said tracks to another without inverting said trays.

6. Conveying apparatus comprising an endless traveling belt having an article-supporting portion that is movable in a horizontal direction, a plurality of superposed tracks, one of said tracks being beneath and adjacent to the article-supporting portion of said belt, endless chains running on said tracks successively from the uppermost track to the lowermost track, a series of trays releasably engaged and advanced by said chains, a deflector disposed above the article supporting portion of said belt, and having an article-engaging surface permanently inclined with respect to the direction of movement of said belt, means for reciprocating said deflector lengthwise with respect to said belt and at substantially the same speed, and means for transferring said trays from one of said tracks to the next track without inverting said trays.

7. Bread-conveying apparatus comprising a traveling belt adapted to convey loaves in series, a second carrier having a portion extending beneath said belt and movable in a different direction with respect thereto, and a deflector having an article-engaging surface inclined with respect to the directions of movement of both of said carriers for periodically transferring loaves from said belt to said carrier.

8. Conveying apparatus comprising a traveling carrier adapted to convey articles in series and in a rectilinear direction, a second carrier having a portion extending beneath said first carrier and movable in a different rectilinear direction with respect thereto, and means for periodically transferring articles from said first carrier to said second carrier, the said transferring means comprising a deflector disposed above said first carrier and having an article-engaging surface permanently inclined with respect to the directions of movement of both of said carriers and means for reciprocating said deflector lengthwise with respect to said first carrier.

9. Conveying apparatus comprising a traveling belt adapted to convey articles in series, a carrier having a portion extending beneath said belt and movable in a different direction with respect thereto, and means for periodically transferring articles from said belt to said carrier, the said transferring means comprising a deflector disposed above the article-conveying portion of said belt and having an article-engaging surface permanently inclined with respect to the directions of movement of both of said carriers, and means for reciprocating said deflector lengthwise with respect to said belt.

10. Conveying apparatus comprising a traveling belt adapted to convey articles in series, a second carrier having a portion adjacent to said belt and movable in a different direction with respect thereto, and means for periodically transferring articles from said belt to said carrier, the said transferring means comprising a deflector disposed above said first-named carrier and having an article-engaging surface permanently inclined with respect to the directions of movement of both of said carriers and means for reciprocating said deflector lengthwise with respect to said first-named carrier at substantially the same speed as the speed of said belt.

11. Conveying apparatus comprising a traveling belt adapted to convey articles in series, a second carrier having a portion extending beneath said belt and movable in a different direction with respect thereto, and means for periodically transferring articles from said belt to said carrier, the said transferring means comprising a vertical deflector disposed above the article conveying portion of said belt and having an article-engaging surface permanently inclined with respect to the directions of movement of both of said carriers, and means for reciprocating said deflector lengthwise with respect to said belt at substantially the same speed as the speed of said belt.

12. Conveying apparatus comprising a continuously advancing article carrier, a second carrier adjacent to said first carrier and movable in a different direction with respect thereto, and means for automatically transferring articles from one of said carriers to the other, the said transferring means comprising a vertical deflector disposed above and across said first-named carrier and having an article-engaging surface permanently inclined with respect to the direction of movement of said carrier, and means for reciprocating said deflector in a rectilinear direction lengthwise with respect to said carrier.

13. Bread-conveying apparatus comprising a traveling belt adapted to convey loaves in series, a carrier having a portion extending beneath said belt and movable in a different direction with respect thereto, and means for periodically transferring a series of loaves from said belt to said carrier, the said transferring means comprising a vertical deflector disposed above and across said traveling belt and having an article-engaging surface permanently inclined forwardly with respect to the direction of movement of said belt, and means for reciprocating said deflector lengthwise with respect to said belt.

14. Bread-conveying apparatus comprising a traveling belt adapted to convey loaves in series, a carrier having a portion extending beneath said belt and movable in a different direction with respect thereto, and means for periodically transferring a series of loaves from said belt to said carrier, the said transferring means comprising a vertical deflector disposed above and across said traveling belt and having an article-engaging surface inclined forwardly with respect to the direction of movement of said belt, and means for reciprocating said deflector lengthwise with respect to said belt at substantially the same speed as the speed of said belt.

15. Conveying apparatus comprising a continuously advancing article carrier, a second carrier adjacent to said first carrier and movable in a different direction with respect thereto, and means for automatically transferring articles from one of said carriers to the other, the said transferring means comprising a track disposed adjacent to and parallel with said belt, a carriage having wheels running on said track, a vertical deflector having an article-engaging surface extending from said carriage above and across said belt, and means for reciprocating said carriage on said track.

16. Conveying apparatus comprising a continuously advancing article carrier, a second carrier adjacent to said first carrier and movable in a different direction with respect thereto, and means for automatically transferring articles from one of said carriers to the other, the said transferring means comprising a track disposed adjacent to and parallel with said belt, a carriage having wheels running on said track, a vertical deflector having an article-engaging surface extending from said carriage above and across said belt, and means for reciprocating said carriage on said track, the said reciprocating means comprising an endless chain and a pitman having its ends connected to said chain and to said carriage.

17. Conveying apparatus comprising a continuously advancing article carrier, a second carrier adjacent to said first carrier and movable in a different direction with respect thereto, and means for automatically transferring articles from one of said carriers to the other, the said transferring means comprising a pair of tracks disposed one above the other adjacent to and parallel with said belt, a carriage having wheels running on said tracks, a vertical deflector having an article-engaging surface extending from said carriage above and across said belt and inclined forwardly with respect to the direction of movement of said belt, and means for reciprocating said carriage on said tracks.

18. Conveying apparatus comprising a continuously advancing article carrier, a second carrier adjacent to said first carrier and movable in a different direction with respect thereto, and means for automatically transferring articles from one of said carriers to the other, the said transferring means comprising a pair of tracks disposed one above the other adjacent to and parallel with said belt, a carriage having wheels engaging said tracks, a vertical deflector having an article-engaging surface extending from said carriage above and across said belt and inclined forwardly with respect to the direction of movement of said belt, and means for reciprocating said carriage on said tracks comprising an endless chain mounted parallel to said tracks, and a pitman having its ends connected to said chain and to said carriage.

19. Conveying apparatus comprising a series of trays, a plurality of superposed tracks adapted to support and guide said trays, chains running on said tracks successively, means for causing said chains to releasably engage and advance said trays, and means for transferring said trays from one of said tracks to the next track without inverting said trays.

20. Conveying apparatus comprising a series of trays, a plurality of superposed tracks adapted to support and guide said trays, endless chains running on said tracks successively from the uppermost track to the lowermost track, means for causing said chains to releasably and intermittently engage and advance said trays, and means for transferring said trays from one of said tracks to the next lower track without inverting said trays.

21. Bread-conveying apparatus comprising a series of trays, a plurality of superposed tracks adapted to support and guide said trays, a pair of endless chains running on said tracks successively from the uppermost track to the lowermost track, sprocket wheels for guiding said chains from one track to the next, and from the lowest track to the uppermost track, means for causing said chains to releasably and intermittently engage and advance said trays, and means for transferring said trays from one of said tracks to the next lower track without inverting said trays.

22. Bread-conveying apparatus comprising a series of trays each having two pins projecting from opposite sides, a plurality of superposed tracks, chains movable on said tracks, and means carried by said chains for engaging said pins to advance said trays, the said means comprising socket members carried by said chain and spaced apart the same distance as the space between said pins, the alternate socket members opening in opposite directions.

23. Bread-conveying apparatus comprising a series of trays each having rollers and having pins projecting from opposite sides, a plurality of superposed tracks, two endless chains movable in said tracks, sockets carried by said chains for engaging said pins to advance said trays, said sockets opening alternately in opposite directions, said tracks having openings near their delivery ends for permitting the rear ends of said trays to tilt downwardly, and guides for engaging said tray rollers and for guiding said trays from one track to the next lower track.

24. Bread-conveying apparatus comprising a series of trays, each having four rollers at each side and having pins projecting from the two intermediate rollers at each side, a plurality of superposed tracks for supporting said tray rollers, two endless chains movable on said tracks, sockets carried by said chains for engaging said pins to advance said trays, said sockets opening alternately in opposite directions, said tracks having openings near their delivery ends for permitting the two rear pairs of tray rollers to drop through said tracks and for thereby permitting the rear ends of said trays to tilt downwardly, and guides for engaging said tray rollers and for guiding said trays from one track to the next lower track.

25. Conveying apparatus comprising a series of article supports having projecting members, and spaced endless chains having sockets for releasably engaging said members and for thereby advancing said article-supports.

26. Conveying apparatus comprising a series of trays having pins projecting from opposite sides, a pair of spaced endless chains, and socket members carried by said chains for releasably engaging said pins and for thereby advancing said trays.

27. Bread-conveying apparatus comprising a series of trays, means for advancing said trays in a plurality of superposed paths, means for transferring said trays from one path to the next lower path without inverting said trays, and means for tilting each of said trays before it is so transferred, and for thereby dumping its load upon the trays advancing in the next lower path.

In testimony whereof I the said HERMAN J. BUCK have hereunto set my hand.

HERMAN J. BUCK.